H. J. SMITH.
REVERSING GEARING.
APPLICATION FILED MAR. 22, 1917.

1,254,075.

Patented Jan. 22, 1918.
3 SHEETS—SHEET 1.

Inventor
H. J. Smith,

Witness

By
Attorney

H. J. SMITH.
REVERSING GEARING.
APPLICATION FILED MAR. 22, 1917.

1,254,075.

Patented Jan. 22, 1918.
3 SHEETS—SHEET 2.

Witness

Inventor
H. J. Smith,
By ... Attorney

H. J. SMITH.
REVERSING GEARING.
APPLICATION FILED MAR. 22, 1917.

1,254,075.

Patented Jan. 22, 1918.
3 SHEETS—SHEET 3.

Witness
J. R. Tomlin
R. L. Parker

Inventor
H. J. Smith,
By C. A. Snow & Co.
Attorney

UNITED STATES PATENT OFFICE.

HENRY J. SMITH, OF MINNEAPOLIS, MINNESOTA, ASSIGNOR TO H. J. SMITH TRACTOR COMPANY, OF HENNEPIN COUNTY, MINNESOTA, A CORPORATION OF MINNESOTA.

REVERSING-GEARING.

1,254,075.  Specification of Letters Patent.  Patented Jan. 22, 1918.

Original application filed May 3, 1915, Serial No. 25,574. Divided and this application filed March 22, 1917. Serial No. 156,710.

*To all whom it may concern:*

Be it known that I, HENRY J. SMITH, a citizen of the United States, residing at Minneapolis, in the county of Hennepin and State of Minnesota, have invented a new and useful Reversing-Gearing, of which the following is a specification.

This invention relates to reversing gearing for use on tractors such as designed for agricultural purposes, one of the objects of the invention being to provide mechanism whereby a tractor can be driven at different speeds either forwardly or backwardly by a direct drive.

With the foregoing and other objects in view which will appear as the description proceeds, the invention resides in the combination and arrangement of parts and in the details of construction hereinafter described and claimed, it being understood that changes in the precise emobdiment of the invention herein disclosed, can be made within the scope of what is claimed, without departing from the spirit of the invention.

In the accompanying drawings the preferred form of the invention has been shown.

In said drawings:—

Figure 1:
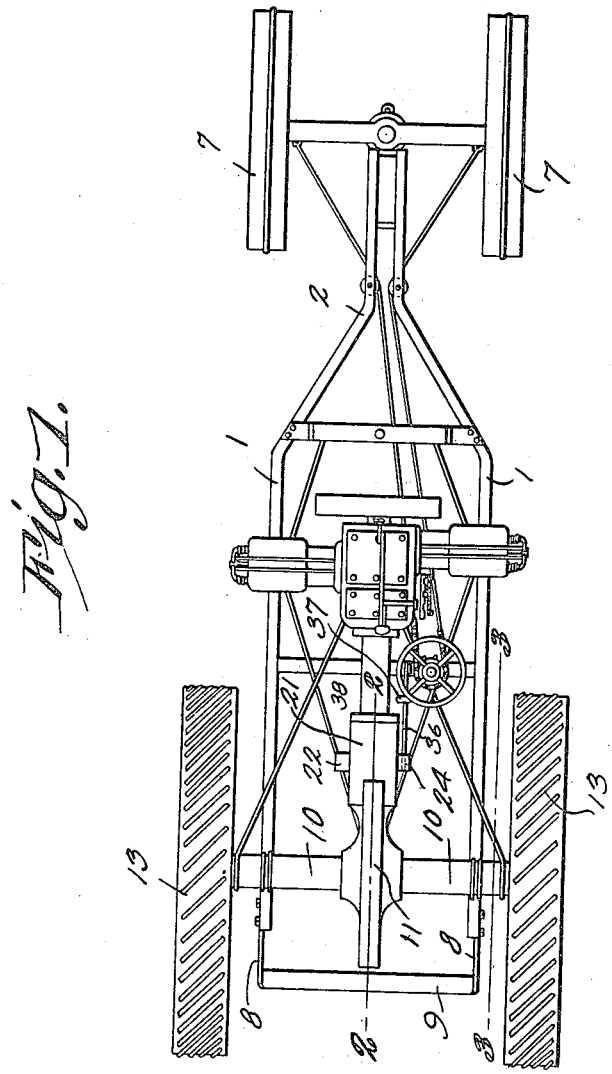
Figure 1 is a plan view of a vehicle embodying the present improvements.
Figure 3:
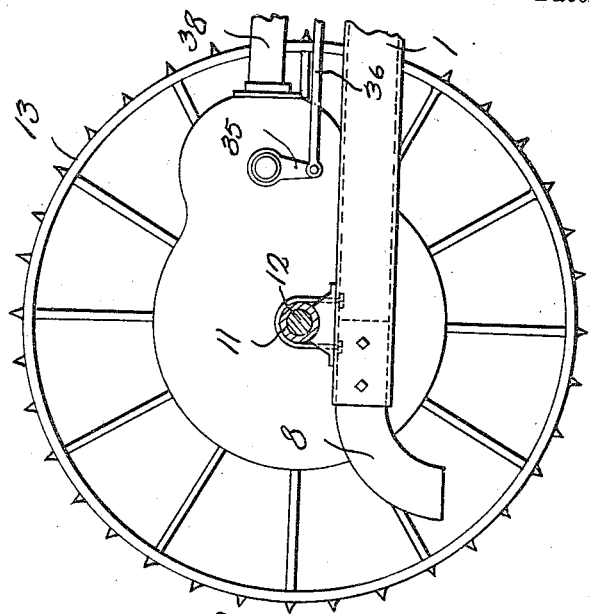
Fig. 3 is an enlarged section through a portion of the machine, said section being taken on the line 3—3 Fig. 1.
Figure 2:
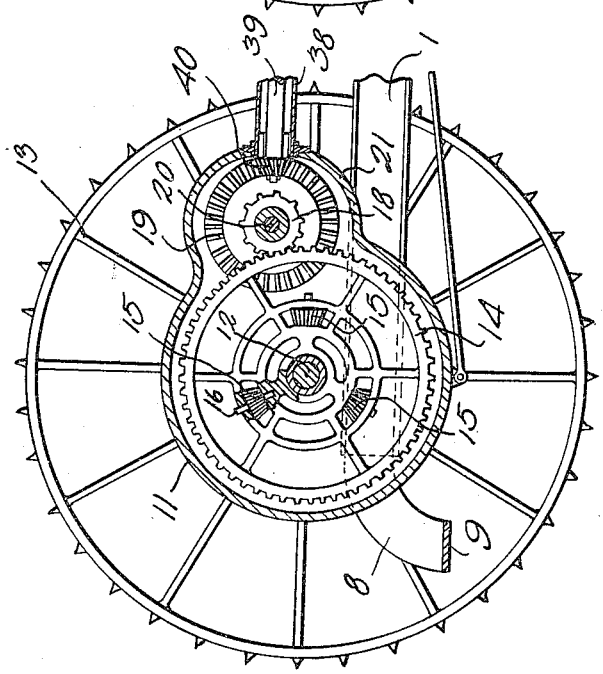
Fig. 2 is a vertical longitudinal section therethrough on line 2—2 Fig. 1, parts being broken away.
Figure 4:
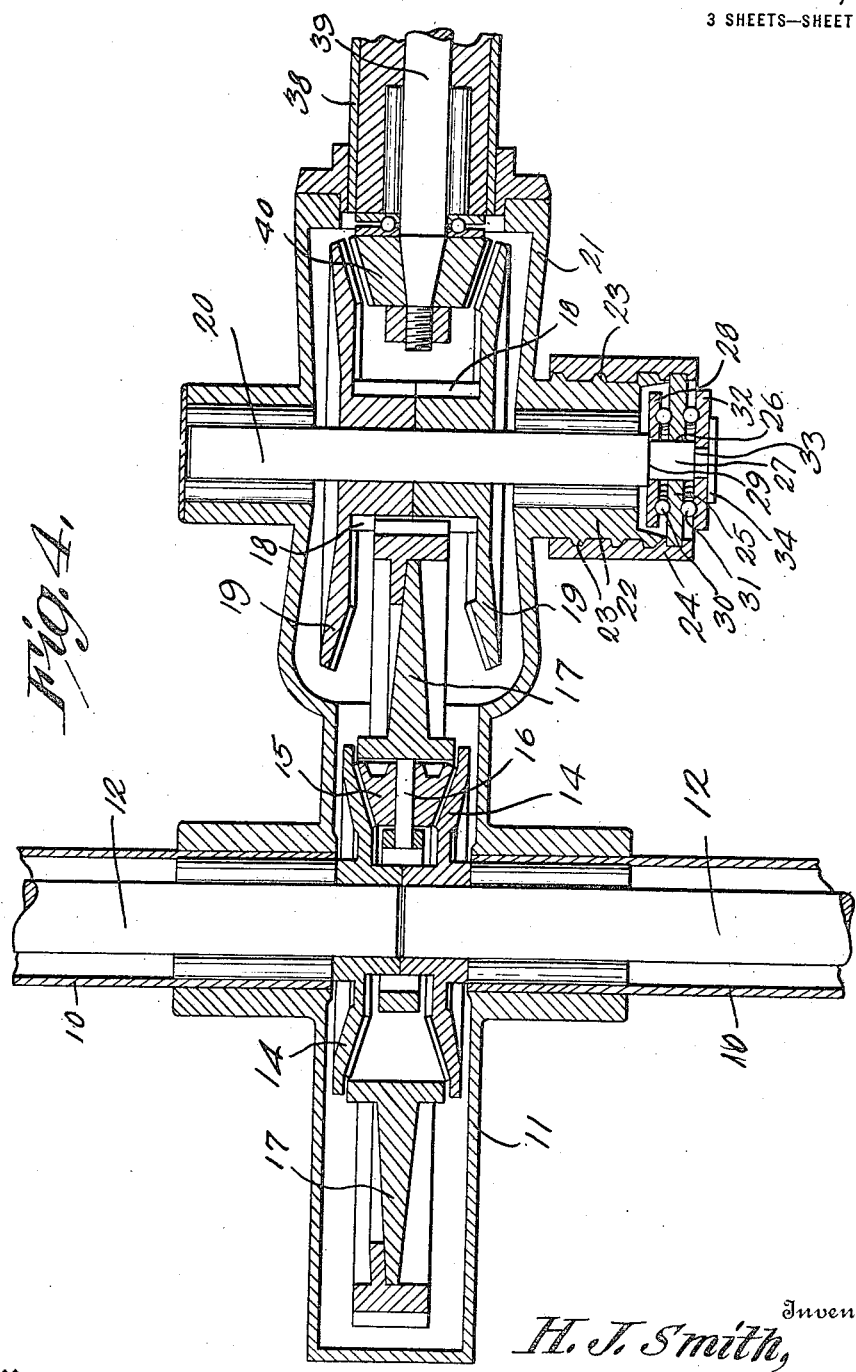
Fig. 4 is an enlarged horizontal section through the rear portion of the transmission.

Referring to the figures by characters of reference 1 designates the frame of a tractor and said frame can be of any suitable size and construction and preferably has a reduced front end 2 supported by front or steering wheels 7.

The rear end of the frame 1 is formed with depending side arms 8 carrying a cross strip 9 to which plows or other implements to be drawn may be secured. Frame 1 is adapted to extend under the rear axle of the machine this axle being made up of tubular sections 10 extending in opposite directions from the casing 11 of the differential gears, there being alining driven shafts 12 within the tubular sections and to which the rear drive wheels 13 are secured. To the inner end of each of the shafts 12 is secured a gear 14, these two opposed gears meshing at all times with a bevel gear 15 interposed between them and journaled on a stem 16 which is secured within a large spur gear 17 extending around the space between the gears 14.

The spur gear 17 is constantly in mesh with two opposed gears 18 formed on the hub portions of opposed bevel gears 19, said gears 18 and 19 being fixedly mounted on a transverse shaft 20. The gears 19 and 18 and the shaft 20 are disposed within an extension 21 of the casing 11, this extension having a tubular side arm 22 into which the shaft 20 projects, said side arm being provided with a screw thread 23 on the outer face thereof of considerable pitch. This thread is engaged by a sleeve 24 in the outer end of which is secured a head 25 provided with a central opening 26 in which is journaled the reduced end portion 27 of shaft 20. A bearing disk 28 is arranged between the head 25 and an interior shoulder 29 formed within arm 22 and interposed between the disk 28 and head 25 is a series of anti-friction balls 30, these balls being mounted in suitable races provided therefor. Another series of balls 31 is interposed between the head 25 and a bearing disk 32 which is secured to the outer end portion of the shaft 20, there being a shoulder 33 on the shaft against which the disk 32 is held by an enlargement 34 at the terminal of the shaft. Thus it will be seen that while the shaft 20 is free to rotate, it is held against longitudinal movement independently of the sleeve 24, by the disks 28 and 32 coöperating with the head 25. However, when the sleeve 24 is shifted longitudinally, shaft 20 will be moved therewith, carrying with it the gears 19 and 18. During this longitudinal movement of the shaft, the gears 18 will not become released from the spur gear 17 but will remain in engagement therewith, the teeth on gears 18 sliding along the teeth on the gear 17. Depending from sleeve 24 is an arm 35 adapted to be swung forwardly or rearwardly in any suitable manner, as by means of a rod 36 connected to a foot lever 37. The pitch of the thread 23 is such that when arm 35 is swung in one direction, shaft 20 will be moved bodily in one direction with the sleeve 24 while, when arm 35 is swung in the opposite direction, the longitudinal movement of shaft 20 and the parts thereon will be reversed.

Extending from the extension 21 of casing 11 is a tubular member 38 in which is journaled a drive shaft 39 having a bevel gear 40 secured to it and interposed between the gears 19. The gears 19 and 40 are so proportioned that, when shaft 30 is in its normal position, neither of the gears 19 mesh with the gear 40. However, when shaft 20 is shifted in one direction in the manner hereinbefore described, one of the gears 19 will be brought into mesh with gear 40 whereas, when shaft 20 is shifted in the opposite direction, the other gear 19 is brought into mesh with gear 40. As a result, the transmission of motion from shaft 39 to gear 17 will result in driving the machine either forwardly or rearwardly as desired, and at the same speed.

The invention covered by this application is more especially a division of that disclosed in my application filed May 3, 1915, Serial No. 25,574.

What is claimed is:—

1. In transmission gearing, the combination with an annular gear, of a transverse shaft, opposed bevel gears fixed thereon, gears extending inwardly from said opposed bevel gears and constantly meshing with the annular gear, an interposed bevel gear normally out of mesh with the two opposed bevel gears, means for driving the interposed bevel gear, and means for shifting the transverse shaft longitudinally to bring either of the opposed bevel gears into mesh with the interposed bevel gear without disengaging the intermediate gear from the annular gear.

2. In transmission gearing, the combination with an annular gear, of a transverse shaft, opposed bevel gears fixed thereon, gears extending inwardly from said opposed bevel gears and constantly meshing with the annular gear, an interposed bevel gear normally out of mesh with the two opposed bevel gears, means for driving the interposed bevel gear, and means for shifting the transverse shaft longitudinally to bring either of the opposed bevel gears into mesh with the interposed bevel gear without disengaging the intermediate gear from the annular gear, said means including a threaded member fixedly mounted, a sleeve engaging and extending around said threaded member beyond the end thereof, and a connection between the sleeve and one end of the shaft, said connection including anti-friction devices.

3. In transmission gearing, the combination of an annular gear, a transverse shaft, opposed bevel gears secured thereto, an intermediate gear meshing with the annular gear and secured to the shaft, a bevel gear interposed between and normally out of mesh with the bevel gears on the shaft, a threaded member concentric with the shaft, a sleeve mounted on said threaded member, means for rotating the sleeve, and means movable with the sleeve and engaging the shaft for shifting said shaft longitudinally during the movement of the sleeve, thereby to move either of the opposed bevel gears into mesh with the interposed bevel gear.

In testimony that I claim the foregoing as my own, I have hereto affixed my signature in the presence of two witnesses.

HENRY J. SMITH.

Witnesses:
H. L. CARROL,
SADYE HETTING.

Copies of this patent may be obtained for five cents each, by addressing the "Commissioner of Patents, Washington, D. C."